Patented Sept. 2, 1952

2,609,358

UNITED STATES PATENT OFFICE 2,609,358

ALKYD RESINS MADE FROM A POLYMERIZED ALCOHOL AND METHOD OF PREPARATION

Harry Fred Pfann, Mount Lebanon, Pa., and Edward L. Kropa, Old Greenwich, Conn., assignors to American Cyanamid Company, New York, N. Y., a corporation of Maine No Drawing. Application April 1, 1947, Serial No. 738,736

4 Claims. (Cl. 260—76)

This application is a continuation-in-part of our copending application Serial No. 413,684, filed October 4, 1941, and now abandoned.

The present invention relates to new and useful compositions, specifically resinous compositions, which are especially suitable for use in the plastics and coating arts, and to methods of preparing the same. More particularly the invention is concerned with compositions comprising a resinous product of reaction of ingredients comprising (1) a monocarboxylic acid, more particularly an aromatic monocarboxylic acid, a saturated or unsaturated aliphatic monocarboxylic acid, etc., (2) a polycarboxylic acid (e. g., a di-, tri- or tetracarboxylic acid) and (3) a polymer of an alcohol having an unsaturated linkage between two carbon atoms in an aliphatic grouping, one of which carbon atoms is directly linked to a saturated carbinol carbon atom, more particularly a polymer of an aliphatic monohydric alcohol having a terminal methylene grouping attached by an olefinic double bond to a carbon atom which is directly linked to a saturated carbinol carbon atom, e. g., polymers of allyl alcohol and methallyl alcohol, specifically polymers of such alcohols wherein the average number of primary hydroxyl groups per molecule is between three or four and about ten. The scope of the invention includes methods of preparing such compositions, as well as the resinous products in soluble, fusible or heat-curable state and in substantially insoluble, substantially infusible or cured state.

The invention claimed herein is directed specifically to a method of preparing a resin comprising the steps of (1) partially esterifying (a) a polymer of an alcohol having ethylenic unsaturation between two carbon atoms in an aliphatic grouping, one of which carbon atoms is directly linked to a saturated carbinol carbon atom, e. g., allyl alcohol and methallyl alcohol, said polymer containing an average number of —CH₂OH groups per molecule of from three or four to ten, with (b) a member selected from the group consisting of saturated, ethylenically unsaturated, and aromatic monocarboxylic acids containing more than one carbon atom, and anhydrides thereof, and (2) completing the esterification reaction at a temperature within the range of 150° C. to 250° C. by reacting, until a composition having an acid number of from 5 to about 160 has been obtained, the product of partial esterification of (a) and (b) with (c) a member selected from the group consisting of saturated, ethylenically unsaturated, and aromatic polycarboxylic acids containing more than two carbon atoms, and anhydrides thereof, said ingredients of (b) and (c) being employed in an amount corresponding to from about 10 to about 70 mol per cent of the latter to from about 90 to about 30 mol per cent of the former, and the ingredient of (a) being employed in an amount corresponding to from about 3 to 30% in excess of that required for complete esterification of the ingredients of (b) and (c) and constituting at least 30% of the total polyhydric alcohol reactant. The invention herein claimed also includes resins which are products of the aforementioned method.

Polymerized allyl alcohol and methods of preparing the same are disclosed and claimed in our aforementioned copending application Serial No. 413,684 and now abandoned. As therein set forth, allyl alcohol can be polymerized under certain conditions to obtain polymeric materials possessing unusual properties which make them useful for many industrial purposes, e. g., by subjecting the said alcohol to the influence of oxygen in numerous ways, as, for example, by blowing oxygen gas through the alcohol until the desired degree of polymerization has been attained. A more detailed description of the polymerization of allyl alcohol is given hereinafter.

Among the uses of polymers of allyl alcohol disclosed in our copending application Serial No. 413,684 is as alcohols in the manufacture of alkyd resins. (As is well known, alkyd resins are formed by effecting reaction between ingredients comprising a polyhydric alcohol and a polycarboxylic acid in the presence of absence of modifying substances.) Since alkyd resins made from such polymers are compatible with, for example, urea-formaldehyde and melamine-formaldehyde resins, such an alkyd resin may be employed to modify and to add to some of the essential properties of the resin into which it is incorporated.

The polymerization of methallyl alcohol is disclosed and claimed in our application Serial No. 413,685, filed October 4, 1941, now Patent No. 2,401,959, issued June 11, 1946. It is also disclosed therein that, upon reaction with organic dicarboxylic acids such as phthalic acid, succinic acid, maleic acid, fumaric acid, sebacic acid and the like, the polymers of methallyl alcohol form esters that are easily polymerized to alkyd resins, and that they are well adapted for the formation of oil-acid modified alkyd resins of the drying or non-drying type by reacting together one or more mols of the polymerized methallyl alcohol with one or more mols of one of the above-mentioned organic dicarboxylic acids such as phthalic acid and its anhydride and with one, two, three or four mols of a higher fatty acid such as stearic acid, oleic acid, linoleic acid, mixed fatty acids obtained from the hydrolysis of linseed oil, dehydrated castor oil and the like.

In Bradley application Serial No. 413,646, filed October 4, 1941, now Patent No. 2,378,827, issued June 19, 1945, are disclosed and claimed drying oils consisting of a polyallyl alcohol having at least five esterifiable primary hydroxy groups esterified with higher fatty acids having an iodine value of at least 100, e. g., fatty acids derived from dehydrated castor oil, soya bean oil, linseed oil and their conjugated isomers, etc.

It was suggested prior to our invention that modified alkyd resins be prepared in which the polyhydric alcohol reactant is replaced in part by a monohydric alcohol, among which allyl alcohol specifically has been mentioned. In the preparation of such modified alkyd resins, it has been stated that the monohydric alcohol should be caused to react first with the polybasic acid reactant before the polyhydric alcohol is caused to take part in the reaction. In such alkyd resins a polymer of allyl alcohol is not used as an initial reactant, nor is such a polymer formed during the course of the reaction.

In Kropa and Bradley application Serial No. 308,958, now Patent No. 2,280,242, and in Patterson application Serial No. 308,953, now Patent No. 2,280,256, both of which applications were filed December 13, 1939 and issued as patents on April 21, 1942, is disclosed the preparation of heat- and oxygen-convertible resins by esterifying a dicarboxylic acid or anhydride, e. g., maleic anhydride, in the presence or absence of a monocarboxylic acid, with a mixture including a polyhydric alcohol and an unsaturated monohydric alcohol, specifically allyl alcohol. The resins are formed either by the simultaneous interesterification of the reactants or by partially esterifying the dicarboxylic acid or anhydride with the polyhydric alcohol and esterifying the resulting product with the unsaturated monohydric alcohol. The unsaturated monohydric alcohol reactant is used in its monomeric form and not as a polymer. Furthermore, the monomeric unsaturated alcohol is not, because of the reaction conditions, converted to a polymeric alcohol during the course of the reaction, but in marked contrast is either immediately esterified or becomes chemically combined in an interesterification product.

In the use of a monomeric unsaturated monohydric alcohol, e. g., monomeric allyl alcohol, as above described, no particular problems are encountered in its esterification to form, for example, a synthetic drying oil or in incorporating it into an alkyd resin to yield a modified alkyd resin. However, when effort is made to utilize a polymer of an alcohol of the kind described in the second paragraph of this specification (especially those which contain an average of at least five primary hydroxyl groups per molecule) as the polyhydric alcohol reactant with a polycarboxylic acid in the preparation of unmodified alkyd resins, considerable difficulty is encountered because of the high reactivity of the polymeric alcohol and the resulting tendency of the resin to gel before a material of sufficiently low acid number has been obtained. On the other hand, polymers of the alcohols used in practicing our invention, especially the water-insoluble polymers, have particular and unique properties, e. g., water resistance, which are not possessed by conventional polyhydric alcohols, e. g., glycerol, and these properties are imparted to a large extent to alkyd resins made from such polymeric alcohols.

The present invention is based on our discovery that a new class of alkyd resins having valuable and unobvious properties can be produced, and the possibilities of gelation during the esterification reaction can be obviated or minimized, as briefly described in the second paragraph of this specification and more fully hereafter. The cured modified alkyd resins of this invention are characterized by their better water resistance and greater hardness than alkyd resins of similar formulation in which a conventional polyhydric alcohol, e. g., glycol, glycerol, pentaerythritol, sorbitol, etc., is used as a reactant. Furthermore, the heat-curable resins are faster curing and, in the case of the drying oil acid-modified resins, are faster drying than the prior resins of similar formulation in which glycerol or other conventional polyhydric alcohol is utilized.

The resinous compositions of this invention may be prepared in the form of air-drying or baking types of materials and hence have wide application in industry, e. g., in the paint, varnish, lacquer and electrical insulation fields. After air-drying or curing the resin films possess excellent oil, water and aging resistance and outstanding hardness.

Although the simultaneous interesterification of all the reactants is not precluded in practicing our invention, we prefer to prepare our resinous compositions by effecting reaction between ingredients comprising (1) a polycarboxylic acid with (2) a product of partial reaction or esterification of (a) a polymer of an alcohol of the kind set forth in the second paragraph of this specification, more particularly such a polymeric alcohol wherein the average number of reactive hydroxyl groups per molecule is at least three, preferably between four or five and about ten with (b) a monocarboxylic acid. By first partially esterifying the polymeric alcohol with a monocarboxylic acid, better results are obtained, especially from the standpoint of ease of reaction of the resulting product with the polycarboxylic acid without gelation of the resin before a product of a desired acid number has been obtained.

The ratios of the reactants may be considerably varied depending, for example, upon the particular reactants employed and the particular properties desired in the finished product. Good results are obtained by using the monocarboxylic acid and polycarboxylic acid, specifically dicarboxylic acid, in an amount corresponding to from about 10 to about 70 mol per cent of the latter to from about 90 to 30 mol per cent of the former, more particularly from 20 to 60 mol per cent of the latter to from 80 to 40 mol per cent of the former. We prefer to use an excess of the polymeric alcohol over the theoretical quantity needed for complete esterification of the monocarboxylic and polycarboxylic acids, since excess acid in the resin is generally considered undesirable whereas a small excess of the polymeric alcohol is not objectionable, and in some cases may even be very desirable, for example, in improving the compatibility of the alkyd resin with urea-formaldehyde, melamine-formaldehyde and other resinous materials. The presence of some unesterified hydroxyl groups, e. g., from about 5 to 15 or 20% of the total hydroxyl groups in the initial polymeric alcohol, also is sometimes beneficial in providing better compatibility of the alkyd resin with other resinous compositions, examples of which have been given above. Quite surprisingly, by using a polymeric alcohol of the kind hereinbefore described it is possible to produce a soluble, fusible alkyd resin containing free hydroxyl groups and of improved compatibility characteristics, whereas with other polyhydric alcohols, e. g., glycerol, the soluble, fusible resins containing free hydroxyl groups are substantially lower in molecular weight. When an excess of the polymeric alcohol is employed, a suitable amount is, for example, from about 3 to 30%, usually about 5 to 10%, in excess of that required for complete esterification of the acids.

The polymeric alcohol should be used in a substantial proportion in order to obtain the advantages of the invention. Obviously the substitution of the polymeric alcohol for only a small part of ethylene glycol, glycerine, pentaerythritol, dipentaerythritol, sorbitol or other polyhydric alcohol heretofore used or suggested for use in the preparation of alkyd resins will result in only a relatively small improvement in the properties of the product. The polymeric alcohol may constitute the sole polyhydric alcohol reactant or, as indicated above, substantial proportions thereof may be used in conjunction with other polyhydric alcohols. Improvements in hardness, water resistance and in other properties hereinbefore mentioned are obtained when the polymeric alcohol constitutes at least 30%, preferably 40% or more, of the total polyhydric alcohol reactant.

The resinous compositions of this invention may be prepared by heating together at an elevated temperature, e. g., at a temperature within the range of 150° to 250° C. or higher, ingredients comprising (1) a monocarboxylic acid, (2) a polycarboxylic acid and (3) a polymer of an alcohol of the kind described in the second paragraph of this specification. Preferably they are prepared by first partially esterifying the polymeric alcohol, e. g., a polymer of an aliphatic monohydric alcohol having a terminal methylene grouping attached by an olefinic double bond to a carbon atom which is directly linked to a —CH₂OH grouping, which polymer contains an average number of primary hydroxyl groups per molecule of between about four and about ten, with (2) a monocarboxylic acid. The resulting partial esterification product is then esterified with a polycarboxylic acid or anhydride, more particularly a dicarboxylic acid or anhydride, e. g., phthalic acid or anhydride, until a resinous composition of the desired acid number, for instance an acid number of about or substantially below 160, e. g., an acid number of 5 to 150, has been obtained. This latter reaction is effected at a suitable elevated temperature, e. g., at a temperature within the range of 150° to 250° C. The reactants advantageously are used in relative proportions such as have been mentioned hereinbefore. When light-colored products are desired the reaction preferably is conducted in an atmosphere free from oxygen. An inert atmosphere, e. g., an atmosphere of carbon dioxide, flue gases or nitrogen, over the reaction mass also advantageously is employed when the monocarboxylic acid reactant is a drying or semi-drying oil fatty acid or mixture of fatty acids.

The polymeric alcohols which are used in practicing the present invention are products of polymerization of alcohols having an unsaturated linkage between two carbon atoms in an aliphatic grouping, one of which carbon atoms is directly linked to a saturated carbinol carbon atom. The monomeric unsaturated alcohols have a structure which may be represented by the formula

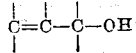

Generally we use polymers of alcohols having a terminal methylene grouping attached by an olefinic double bond to a carbon atom which is directly attached to a saturated carbinol carbon atom. Such alcohols have a structure which may be represented by the formula

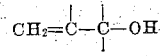

Good results are obtained with polymers of alcohols having not more than about eighteen carbon atoms and having at least one unsaturated carbon-to-carbon linkage for each six carbon atoms. We prefer to use a polymer of an aliphatic monohydric alcohol having a terminal methylene grouping attached by an olefinic double bond to a carbon atom which is directly linked to a

grouping, more particularly a —CH₂OH grouping.

Illustrative examples of unsaturated alcohols which may be polymerized and the polymers used in carrying the present invention into effect are:

Allyl alcohol
α-Chloroallyl alcohol
Methallyl alcohol
Crotyl alcohol (2-buten-1-ol)
Ethallyl alcohol
3-hydroxy-1-butene
3-hydroxy-3-methyl-1-butene
3-hydroxy-3-ethyl-1-butene
3-hydroxy-2-methyl-1-butene
3-hydroxy-2,3-dimethyl-1-butene
3-hydroxy-1-pentene
3-hydroxy-3-methyl-1-pentene
3-hydroxy-3-ethyl-1-pentene
3-hydroxy-2-methyl-1-pentene
3-hydroxy-1-hexene
Cinnamyl alcohol
Tiglyl alcohol
2-cyclopentenol
2-cyclohexenol
1-hydroxy-2-methyl-2-pentene
1-hydroxy-2-methyl-2-hexene
3-chloro-2-buten-1-ol
1-hydroxy-2,3-butadiene
3-hydroxy-1,4-pentadiene
1-hydroxy-2,4-hexadiene
1-hydroxy-2,5-hexadiene
2-hydroxy-3,5-hexadiene
4-hydroxy-2,5-dimethyl-1,5-hexadiene
3-hydroxy-1-hexen-5-yne
3-hydroxy-2-methyl-1-penten-4-yne
1-hydroxy-3,7-dimethyl-2,7-octadiene Any suitable method may be employed in preparing the polymeric alcohols used in practicing our invention. They can be polymerized by subjecting them to the influence of oxygen, e. g., by passing oxygen through the heated alcohol in the presence or absence of an oxygen-yielding or other suitable polymerization catalyst, e. g., hydrogen peroxide, benzoyl peroxide, barium peroxide, etc. Air may be used as the source of oxygen, but since air contains only a relatively small proportion of oxygen the reaction proceeds very slowly under these conditions and, especially in the case of the more volatile alcohols, the large volume of air required may lead to the loss of considerable quantities of alcohol from the reaction mass by volatilization. Ozonized air may be employed if desired.

Polymerization of allyl alcohol

In polymerizing allyl alcohol the polymerization reaction preferably is effected at temperatures of the order of 85° C. or higher. As allyl alcohol boils at 96° C. it is convenient to conduct the polymerization by blowing oxygen through the alcohol heated to its refluxing temperature. Production of polymerized allyl alcohol is speeded up considerably when operating at temperatures above the boiling point of the alcohol. To obtain these higher temperatures it is necessary to work under pressure, and we have found that it is possible to produce fairly high yields of polymer in a matter of a few hours by operating at higher temperatures and at superatmospheric pressures, which conditions may be obtained by the use of a pressure autoclave. A further increase in the rate of polymerization may be obtained by the use of suitable catalysts. We have found that, for example, diallyl ether will reduce considerably the induction period which precedes oxygen take-up when operating at high temperatures and pressures in an autoclave. Peroxides such as tert.-butyl hydroperoxide, cobalt salts, $NO_2$, acrolein and acrylic acid also may be employed as catalysts for the polymerization. The allyl alcohol which is polymerized should be free of antioxidants, such as hydroquinone, or other inhibitors which may have developed during the manufacture of the alcohol, or on standing, or which may have been added to the alcohol. When a polymerization inhibitor is known or is expected to exist in the alcohol, the alcohol should be purified before any attempt is made to polymerize it. Suitable purification steps include simple distillation of the alcohol or, preferably, distillation of the alcohol from an alkali such as NaOH, KOH, CaO, etc. Alcohol purified in this manner polymerizes much more readily than contaminated alcohol.

When polymerizing allyl alcohol as above described, a small amount of the alcohol may be oxidized to acrolein which, in turn, may be oxidized to acrylic acid. These two latter substances may polymerize and form by-product materials in the reaction product. It is also possible that some of the acrylic acid and/or acrolein may copolymerize with unpolymerized or partially polymerized allyl alcohol to yield complex copolymers. Also, acrylic acid may react with part of the allyl alcohol or with part of the polymeric allyl alcohol (polyallyl alcohol) in the reaction mass to form esters.

The possibility that at least some of these side reactions may take place is indicated by the fact that most of the products formed as above briefly described and more fully in our aforementioned copending application Serial No. 413,684 show on chemical analysis small acid numbers, ester numbers and saponification numbers, indicating the presence of small amounts of acid and ester and other complex structures in the polymeric material. The iodine values obtained upon analysis of many representative samples of polymerized allyl alcohol have indicated, however, that the product has a molecular weight corresponding to an average of between three or four and about ten, in most cases at least five (e. g., from five to ten or more) units of approximately the same molecular weight as allyl alcohol per molecule of polymer. The polymerization products also generally show a hydroxyl number of at least 500, which indicates that the polymer is essentially alcoholic in structure.

A purer product may be obtained, if desired, by removing any unpolymerized allyl alcohol, or any acrylic acid, acrolein, polymers of low molecular weight or other impurities that may be present therein. Such substances may be removed, for example, by washing the polymeric mass with water or some other solvent in which the impurities are soluble but in which the polyallyl alcohol is insoluble. Most of these impurities also may be removed by volatilization, e. g., by heating the polymeric product under a pressure of a few millimeters, or by blowing steam through the reaction product, or by both such means. The use of steam tends to hydrolyze any ester groupings, thereby adding to the number of hydroxyl groups in the polymeric material.

Products obtained by the polymerization of allyl alcohol as above described vary in nature from thin, syrupy balsams to thermoplastic solids depending, for example, upon their degree of polymerization. They are usually colorless and transparent. The polymers increase in specific gravity and index of refraction with increase in polymerization, but in general have specific gravities at 25° C. of at least 1.00 and an index of refraction at 25° C. of at least 1.450. They are insoluble in water, benzene, camphor, acetophenone, dioxane and acetone but may be dissolved in alcohols (e. g., methyl, ethyl, butyl, etc., alcohols) and, surprisingly, are more soluble in alcohol-water mixtures than in alcohol alone.

Various uses of polymerized allyl alcohol are given in our aforementioned copending application Serial No. 413,684, including their use as alcohols in the manufacture of alkyd resins. Reference also is made to this same application for more detailed information on the preparation of polymeric allyl alcohol, including illustrative examples thereof. As shown in Example 5 of application Serial No. 413,684, polymeric allyl alcohol also can be produced by polymerizing acrolein and catalytically reducing the polymeric acrolein with hydrogen using nickel or palladium as a catalyst.

In a manner similar to that described above and in application Serial No. 413,684 with particular reference to the production of polymeric allyl alcohol and in Patent No. 2,401,959 with particular reference to the polymerization of methallyl alcohol, other unsaturated alcohols of the kind mentioned in the second paragraph of this specification, numerous examples of which hereinbefore have been given, may be polymerized. The polymerization products may be described as being oxy-condensation polymers of the unsaturated alcohol in which the monomer units are joined principally by carbon-to-carbon linkages. However, a minor proportion of the units may be joined by ethereal oxygen atoms. As indicated hereinbefore, the majority of the functional groups in the polymer are hydroxy groups, although there also may be present units of unsaturated acids, unsaturated alcohol esters of unsaturated acids and/or unsaturated aldehydes. Thus, in the products obtained by polymerizing, for example, allyl alcohol there may be present units from acrylic acid, allyl acrylate and/or acrolein.

Other methods also may be used in the preparation of the polymeric alcohols. For instance, the unsaturated alcohols can be formed from derivatives (e. g., halides and esters) of unsaturated alcohols. The halides can be polymerized, for example, by treatment with boron fluoride under anhydrous conditions at a low temperature as described in Patent No. 2,331,869, by exposure to actinic light, or by a combination of such methods. The polymeric halides then are hydrolyzed by suitable means, e. g., under the catalytic action of a cuprous compound, to the corresponding polymeric alcohol.

Various unsaturated alcohol esters may be polymerized, e. g., by heating in the presence or absence of a polymerization catalyst, and the polymeric ester then hydrolyzed to yield a polymeric alcohol of the kind used in practicing the present invention. Illustrative examples of unsaturated alcohol esters that thus may be polymerized and subsequently hydrolyzed are: allyl acetate, methallyl acetate, crotyl acetate, allyl propionate, ethallyl butyrate, α-chloroallyl acetate, cinnamyl propionate, the butyric ester of 3-hydroxy-1-butene, allyl benzoate, β-methoxyallyl acetate, diallyl phthalate, diallyl succinate, diallyl adipate, dicrotyl dilactate, diallyl dihydracrylate, dipropargyl diglycolate, diallyl dilactate, dimethallyl diglycolate, etc. The polymeric alcohols are formed from the polymeric esters by any suitable means, e. g., by hydrolysis or alcoholysis thereof. Alcoholysis of the polymeric esters may be effected in the presence of an alcoholate of a basic metal.

Various polycarboxylic acids, including saturated aliphatic polycarboxylic acids, alpha,beta-unsaturated polycarboxylic acids and aromatic polycarboxylic acids, may be used in practicing our invention. Illustrative examples of such acids are malonic, succinic, glutaric, adipic, pimelic, suberic, sebacic, azelaic, citric, tricarballylic maleic, monohalomaleic, fumaric, monohalofumaric, citraconic, mesaconic, aconitic, itaconic, phthalic, benzoylphthalic, diphenic, terephthalic, benzophenone - 2,4' - dicarboxylic, etc., acids. If available, anhydrides of the polycarboxylic acids may be employed, e. g., maleic anhydride, phthalic anhydride, anhydrides formed by adding maleic anhydride to a conjugated diolefine or to a similar compound having a conjugate system of double bonds, etc. The terms "polycarboxylic acid" and "dicarboxylic acid" as used generally herein include within their meanings the anhydrides of the acids.

A wide variety of monocarboxylic acids or mixtures thereof may be used in carrying our invention into effect, including saturated and unsaturated aliphatic monocarboxylic acids and aromatic monocarboxylic acids. Illustrative examples of such acids are acetic, phenylacetic, propionic, butyric, valeric, caproic, heptylic, caprylic, nonylic, capric, palmitic, margaric, stearic, crotonic, oleic, palmitoleic, linoleic, linolenic, arachidonic, clupanodonic, licanic, eleostearic, ricinoleic, ricinic, lactic, benzoic, toluic, salicylic, abietic, tall oil, which contains both rosin acids and unsaturated fatty acids, etc. A single or a plurality of monocarboxylic acids may be employed. We may use acids derived from non-drying, semi-drying or drying oils, e. g., the fatty acids of tung oil, hempseed oil, candle nut oil, linseed oil, perilla oil, safflower oil, soya bean oil, walnut oil, oiticica oil, castor oil, dehydrated castor oil, blown castor oil, isomerized linseed oil, fish oils, blown fish oils, rubberseed oil, rapeseed oil, cottonseed oil, coconut oil, poppyseed oil, sunflowerseed oil, palm oil, corn oil, wheat oil, sesame oil, peanut oil, olive oil, etc.

Oils such as mentioned above are mainly glycerides, more particularly triglycerides, of fatty acids. Such oils may be used instead of the acids themselves as a starting reactant. Instead of the various triglycerides mentioned above the various monoglycerides and diglycerides of the fatty acids also may be employed if desired.

When the oils are used alcoholysis occurs, that is, glycerol is split off thereby allowing the fatty acids to combine with the polymeric alcohol. In such an ester interchange reaction an agent for promoting or accelerating the reaction usually is employed, for example a basic material such as sodium or potassium hydroxide or carbonate, calcium hydroxide, etc. The glycerol ordinarily is not removed from the reaction mass, since it will react with any esterifiable groupings present in the monocarboxylic and polycarboxylic acid reactants thereby further to decrease the possibility of gelation and to modify the properties of the finished alkyd resin.

If available anhydrides of monocarboxylic acids may be employed, e. g., acetic anhydride. The term "monocarboxylic acid" as used generally herein includes within its meaning the anhydride of such an acid.

As indicated hereinbefore, the polymeric alcohols used in practicing the present invention have a high reactivity and tend to form a gel, when used alone as a reactant with a polycarboxylic acid, before a resin having a sufficiently low acid number has been obtained. The addition of rosin, tall oil or other monocarboxylic acid or monocarboxylic acid-containing material, numerous examples of which have been given above, minimizes the possibility of gelation and allows the reaction to proceed until a resin of lower acid number and of improved solubility characteristics has been obtained. The addition of other reactants, in addition to a monocarboxylic acid, such as a monohydric alcohol (e. g., methyl, ethyl, propyl, butyl, benzyl, cyclohexyl, etc., alcohols), as well as ethylene glycol, diethylene glycol, triethylene glycol, glycerol, and similar polyhydric alcohols, further aids in continuing the reaction, without gelation, until the acid number has reached the desired point. Monohydric alcohols and the lower polyhydric alcohols, such as mentioned above, internally plasticize the resin and tend to yield heat-curable products which are less hard, lower in melting point and more soluble in organic solvents than the products obtained when such alcohols are omitted. Saturated aliphatic monocarboxylic acids, e. g., acetic, butyric, stearic, palmitic, etc., also internally plasticize the resin and tend to yield products which are softer and more soluble in organic solvents than the resins obtained when an unsaturated aliphatic monocarboxylic acid is used.

When air-drying or rapidly curing resins are desired, a semi-drying or drying oil or fatty acids derived from such oils are used. Because of the numerous hydroxyl groups (e. g., an average of five to ten or more per molecule) in the polymeric alcohols used in practicing our invention, a large number of unsaturated fatty acid radicals can be caused to react with these hydroxyl groups, so that the resulting heat-curable alkyd resin has a high degree of functionality and can polymerize very rapidly. By the use of a polymeric alcohol of high reactivity such as has been described herein, air-drying alkyds can be prepared using semi-drying oils, e. g., palm, corn, cottonseed, sesame, etc., oils, or acids derived therefrom, as the modifying reactant. The drying properties of alkyds prepared from drying oils or drying oil acids are improved by using one or more of the aforementioned polymeric alcohols as the polyhydric alcohol reactant in making the alkyd resin.

Fatty acids obtained by the hydrolysis or saponification of animal or vegetable oils such as above mentioned are preferred when it is desired to avoid the presence of glycerol in the reaction mass. Either mixed fatty acids derived from such oils or the individual acids present therein in relatively pure state, e. g., saturated or unsaturated aliphatic monocarboxylic acids, may be employed. Unsaturated aliphatic monocarboxylic acids, and especially the polyunsaturated aliphatic monocarboxylic acids, e. g., linoleic, linolenic, eleostearic, etc., are preferred when resinous compositions having optimum air-drying characteristics are desired.

Tall oil is especially suitable for use as the modifying reactant in practicing the present invention. It consists mainly of fatty acids, fatty acid soaps, rosin (including rosin acids) and unsaponifiable compounds. Either crude or refined tall oils may be used, or tall oil fatty acids, or mixtures containing tall oil fatty acids and rosin acids. We may use tall oil which has been treated to improve its color and odor by heating with metallic zinc as more fully described and claimed in the copending application of Jerry J. Smerechniak and George W. Barlow, Serial No. 732,932, filed March 6, 1947, now Patent No. 2,515,739, dated July 18, 1950. The term "tall oil acids" as used in the appended claims includes both the individual monocarboxylic acid components of tall oil in relatively pure state, as well as the crude and refined mixtures of tall oil acids as ordinarily produced regardless of the relative proportions of ingredients in the mixture.

In order that those skilled in the art better may understand how the present invention may be carried into effect the following examples are given by way of illustration and not by way of limitation. All parts are by weight.

*Example 1*

| | Parts |
|---|---|
| Polymeric allyl alcohol having a hydroxyl number of about 680 | 130.0 |
| Phthalic anhydride | 74.0 |
| Fatty acids of dehydrated castor oil | 140.0 | are heated together while agitating with carbon dioxide, which blankets the reaction mass, for 17 hours at 180° to 200° C. The product is a heat-curable, dark-colored, viscous resin which has an acid number of 5 to 6. A film of the resin applied in solution state to a tin panel cures to a hard, water-resistant coating upon heating for 10 minutes at 110° C. The coated panel shows no whitening when immersed in distilled water for 30 minutes at room temperature.

*Example 2*

| | Parts |
|---|---|
| Polymeric allyl alcohol having a hydroxyl number of about 600 | 57.0 |
| Phthalic anhydride | 29.6 |
| Fatty acids of dehydrated castor oil | 56.4 |

The phthalic anhydride and fatty acids are heated together to 150° C., and the polymeric allyl alcohol is added to the well-stirred mixture without preventing access of air to the reaction mass. Darkening occurs after heating for 30 minutes in this manner. Carbon dioxide is introduced into the reaction mass as described under Example 1, and heating is continued for 7 hours at 160° to 180° C., yielding a dark-colored, heat-curable resinous material having an acid number below 100.

*Example 3*

A

| | Parts |
|---|---|
| Polymeric allyl alcohol having a hydroxyl number of about 680 | 113.3 |
| Refined soya bean oil | 215.0 |
| Calcium hydroxide | 0.45 |
| Sodium hydroxide | 0.26 |

The above-stated amount of soya bean oil and 85 parts of polymeric allyl alcohol are heated to 235° C. over a period of 40 minutes, after which 0.45 part of calcium hydroxide is added. After heating for 50 minutes at 235° C., 0.13 part of sodium hydroxide is added and, after 5 minutes, the remainder (28.3 parts) of the polymeric allyl alcohol. Heating is continued at 235° C. for about 28 minutes, after which the remainder (0.13 part) of the sodium hydroxide is added. The reaction is completed by heating for an additional 42 minutes at 235° C., yielding polymeric allyl alcohol partially esterified with fatty acids of soya bean oil. This partial esterification product then is reacted with phthalic anhydride as described under B.

B

| | Parts |
|---|---|
| Partial esterification product of A | 286.00 |
| Phthalic anhydride | 110.28 | are heated together to 200° C. over a period of 20 minutes while passing a stream of carbon dioxide through the reaction mass. The temperature is raised to 235° C. over a period of 65 minutes. A soluble, fusible resin which is heat-convertible to a substantially insoluble, substantially infusible state is obtained by further heating the reaction mass for 2 hours at 235° C. This resin has an acid number of 44.5. When the cold resin is heated to 235° C. over a period of 30 minutes and further heated for 45 minutes at 235° C., it does not gel.

The resinous composition of this example yields hard, well-cured, water-resistant films from solutions thereof upon heating a tin panel coated with a solution of the resin for 15 minutes at 110° C.

*Example 4*

| | Parts |
|---|---|
| Polymeric allyl alcohol having a hydroxyl number of about 680 | 46.5 |
| Benzoic acid | 24.4 |
| Maleic anhydride | 29.4 |

The polymeric allyl alcohol and benzoic acid are heated together for 3 hours at 175° C. The maleic anhydride is added and the resulting reaction mass is heated for 25 minutes at 175° C. to yield a resinous material which, when cool is brittle, slightly tacky and clear amber in color in thin layers.

*Example 5*

| | Parts |
|---|---|
| Polymeric allyl alcohol having a hydroxyl number of about 680 | 46.5 |
| Benzoic acid | 73.2 |
| Maleic anhydride | 19.6 |

The polymeric allyl alcohol and benzoic acid are heated together for 2 hours at 160° to 170° C. The maleic anhydride is now added. After heating the resulting reaction mass for 2½ hours at 170° C., a resin is obtained that, when cool, is slightly opaque and which has a tackiness somewhat resembling a sticky wax.

Example 6

| | Parts |
|---|---|
| Polymeric allyl alcohol having a hydroxyl number of about 680 | 46.5 |
| Benzoic acid | 73.2 |
| Maleic anhydride | 19.6 |

The polyallyl alcohol and benzoic acid are heated together for 17 hours at 200° C., yielding an opaque partial esterification product having an acid number of 92. This product is now heated with the maleic anhydride in accordance with the following approximate heating schedule:

| Temp., °C | Time in Hours |
|---|---|
| 170 | 2 |
| 175 | 1 |
| 180 | 3 |
| 190 | 3 |
| 200 | 15 |

At the end of this period the hot resin is a clear amber in color in thin layers, cooling to a sticky, slightly opaque resinous material which is somewhat waxy in nature and has an acid number of 107.

Twenty parts of the above resin and 40 parts of nitrocellulose (½ sec.) are mixed with 132 parts of butyl acetate and 43 parts of toluene, and the resulting mixture is warmed on a steam bath, yielding a clear, brown solution. Air-dried films of this solution are hard and slightly yellow in color.

Example 7

| | Parts |
|---|---|
| Polymeric allyl alcohol having a hydroxyl number of about 680 | 65.0 |
| Phthalic anhydride | 37.0 |
| Tall oil acids (mixture of fatty acids and rosin containing rosin acids and about 10% of unsaponifiable material) | 70.0 |

The polyallyl alcohol and the tall oil acids are heated together for 10 hours at 180–200° C. The phthalic anhydride is added to the resulting partial esterification product, and heating is continued at a gradually increasing temperature ranging between 180° and 210° C. until a soluble, fusible alkyd resin which is convertible under heat to a substantially insoluble, substantially infusible state is obtained.

Example 8

| | Parts |
|---|---|
| Polymeric allyl alcohol having a hydroxyl number of about 680 | 46.5 |
| Benzoic acid | 24.4 |
| Succinic acid | 35.4 | are heated together for 30 minutes at 175° C. to yield a resinous material which, when hot, is a clear amber in color in thin layers and an opaque, tacky resin somewhat wax-like in nature when cold.

Example 9

| | Parts |
|---|---|
| Polymeric allyl alcohol having a hydroxyl number of 680 | 46.5 |
| Benzoic acid | 73.2 |
| Sebacic acid | 40.4 |

The same procedure is followed as described under Example 7. The acid number of the resin is about 162. A butyl acetate-toluene solution of this resin and nitrocellulose (½ sec.) is prepared as described under Example 6. Air-dried films produced from this solution are hard, transparent and slightly yellow in color.

Example 10

The same formula and procedure are followed as described under Examples 8 and 9 with the exception that 29.6 parts of phthalic anhydride is used in place of 35.4 parts of succinic acid as in Example 8 or instead of 40.4 parts of sebacic acid as in Example 9. Air-dried films of solutions of the resin and nitrocellulose, which solutions are prepared as described in Example 8, are hard, transparent and slightly yellow in color.

The following examples illustrate the results obtained when an unmodified alkyd resin is made from polymeric allyl alcohol.

Example 11

| | Parts |
|---|---|
| Polymeric allyl alcohol having a hydroxyl number of about 600 | 90 |
| Succinic acid | 30 | are heated together in an oil bath maintained at 190°–220° C. for 1¼ hours, while passing a stream of carbon dioxide through the reaction mass. At the end of this period the product is a dark tan-colored gel, which is insoluble in the ordinary solvents.

Example 12

| | Parts |
|---|---|
| Polymeric allyl alcohol having a hydroxyl number of about 680 | 100 |
| Phthalic anhydride | 83 | are heated together, while passing a stream of carbon dioxide through the reaction mass, in an oil bath maintained at 150° C. for 3 hours, after which the temperature is raised within 15 minutes to 200° C. After heating for an additional 16¼ hours at this higher temperature the product gels to a light-colored solid.

Example 13

| | Parts |
|---|---|
| Polymeric allyl alcohol having a hydroxyl number of about 680 | 100 |
| Tricarballylic acid | 100 |

The same procedure is followed as described under the preceding example with the exception that heating at a bath temperature of 200° C. is continued for only 15 minutes. At the end of this period the tricarballylic ester gels to a light-colored solid.

Example 14

| | Parts |
|---|---|
| Polymeric allyl alcohol having an acid number of about 680 | 85 |
| Phthalic anhydride | 74 | are heated together for 4 hours at 200° C. under an atmosphere of carbon dioxide, yielding a viscous, difficultly soluble product having an acid number of 120.

Example 15

| | Parts |
|---|---|
| Polymeric allyl alcohol having a hydroxyl number of about 680 | 68 |
| Phthalic anhydride | 148 | are heated together to 190° C. under an atmosphere of carbon dioxide, and held at this temperature for 30 minutes. The temperature is then lowered to 175° C. After heating for 1 hour and 50 minutes at this lower temperature, the mass begins to gel.

The alkyd resins of this invention are particularly useful in applications where hard films having excellent water resistance are desired. Both the air-drying and baking types of alkyds may be used advantageously because of their improved water resistance and drying characteristics in such applications as, for example, the production of printing inks, in paste compositions for application to cloth and the like, in the manufacture of linoleum, in the preparation of paints, varnishes, lacquers, enamels and other coating compositions, etc. They are compatible with urea-formaldehyde resins, melamine-formaldehyde resins, urea-melamine-formaldehyde resins, cellulose derivatives including cellulose ethers, e. g., ethyl cellulose, etc., cellulose esters, e. g., cellulose nitrate, etc., and with many other materials, yielding compositions having improved properties over the unmodified material.

We claim:

1. A method of preparing a resin comprising the steps of (1) partially esterifying (a) a polymer of an alcohol having ethylenic unsaturation between two carbon atoms in an aliphatic grouping, one of which carbon atoms is directly linked to a saturated carbinol carbon atom, said polymer containing an average number of —$CH_2OH$ groups per molecule of from three to ten, with (b) a member selected from the group consisting of saturated, ethylenically unsaturated, and aromatic monocarboxylic acids containing more than one carbon atom, and anhydrides thereof, and (2) completing the esterification reaction at a temperature within the range of 150° C. to 250° C. by reacting, until a composition having an acid number of from 5 to about 160 has been obtained, the product of partial esterification of (a) and (b) with (c) a member selected from the group consisting of saturated, ethylenically unsaturated, and aromatic polycarboxylic acids containing more than two carbon atoms, and anhydrides thereof, said ingredients of (b) and (c) being employed in an amount corresponding to from about 10 to about 70 mol per cent of the latter to from about 90 to about 30 mol per cent of the former, and the ingredient of (a) being employed in an amount corresponding to from about 3 to 30% in excess of that required for complete esterification of the ingredients of (b) and (c) and constituting at least 30% of the total polyhydric alcohol reactant.

2. A method as in claim 1 wherein the polymer of the alcohol of (a) is polymeric allyl alcohol containing an average number of —$CH_2OH$ groups per molecule of from four to ten.

3. A method as in claim 1 wherein the polymer of the alcohol of (a) is polymeric methallyl alcohol containing an average number of —$CH_2OH$ groups per molecule of from four to ten.

4. A resin which is the product of the method of claim 1.

HARRY FRED PFANN.
EDWARD L. KROPA.

REFERENCES CITED

The following references are of record in the file of this patent:

UNITED STATES PATENTS

| Number | Name | Date |
|---|---|---|
| 1,972,521 | Iliff et al | Sept. 4, 1934 |
| 1,975,246 | Zwilgmeyer | Oct. 2, 1934 |
| 2,152,683 | Eichwald | Apr. 4, 1939 |
| 2,178,475 | Frick | Oct. 31, 1939 |
| 2,332,460 | Muskat et al. | Oct. 19, 1943 |
| 2,360,393 | Burrell | Oct. 17, 1944 |
| 2,378,827 | Bradley | June 19, 1945 |
| 2,401,959 | Pfann et al. | June 11, 1946 |
| 2,426,913 | Adelson et al. | Sept. 2, 1947 |

OTHER REFERENCES

Smith: Journal of the Society of Chemical Industry, vol. 20, November 1901, pages 1075, 1076.

Ellis: The Chemistry of Synthetic Resins, vol. 2, 1935, page 928, also pages 921–925, 966–967.